United States Patent
Ginsberg et al.

(10) Patent No.: US 8,113,028 B2
(45) Date of Patent: Feb. 14, 2012

(54) PLATFORM FOR INDUSTRIAL INSTALLATIONS, PARTICULARY FOR HIGH-PRESSURE DESCALERS, EMERGENCY SHEARS AND PENDULUM SHEARS IN ROLLING MILL TRAINS OR THE LIKE

(75) Inventors: Klaus Ginsberg, Siegen (DE); Günter Müller, Drolshagen (DE); Klaus Bäumer, Kreuztal (DE); Volker Heinfling, Hilchenbach (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 767 days.

(21) Appl. No.: 10/589,827

(22) PCT Filed: Jan. 26, 2005

(86) PCT No.: PCT/EP2005/000742
§ 371 (c)(1),
(2), (4) Date: Jul. 21, 2008

(87) PCT Pub. No.: WO2005/089971
PCT Pub. Date: Sep. 29, 2005

(65) Prior Publication Data
US 2008/0276996 A1 Nov. 13, 2008

(30) Foreign Application Priority Data
Feb. 20, 2004 (DE) .................. 10 2004 008 491

(51) Int. Cl.
*B21B 31/07* (2006.01)
(52) U.S. Cl. ........................... 72/237; 72/238
(58) Field of Classification Search ............... 72/39, 40, 72/236, 237, 238, 239, 455; 29/81.01, 81.03, 29/81.06, 81.07, 81.08; 134/2, 15, 18; 137/343, 137/356
See application file for complete search history.

(56) References Cited

U.S. PATENT DOCUMENTS

| 3,518,736 A | * | 7/1970 | Domeika | 29/81.08 |
| 4,251,956 A | * | 2/1981 | Hirata et al. | 451/91 |
| 4,471,642 A | * | 9/1984 | Wilson | 72/238 |
| 5,255,581 A | * | 10/1993 | Glomb et al. | 82/130 |
| 5,272,798 A | * | 12/1993 | Cole et al. | 29/81.08 |

(Continued)

FOREIGN PATENT DOCUMENTS

DE G 94 08 440.9 9/1994

(Continued)

OTHER PUBLICATIONS

Patent Abstract of Japan JP 54 137 464, Oct. 1979.

(Continued)

*Primary Examiner* — Edward Tolan
(74) *Attorney, Agent, or Firm* — Abelman, Frayne & Schwab

(57) ABSTRACT

A platform for industrial installations, in particular for high-pressure descalers (3a) or other machines (3) with optionally bundled supply, discharge, and/or distribution conduits (11) which in operational position, are connectable with fixed conduits of a respective machine (3), can be provided as a central installation for connecting media and power lines that can be monitored and easily inspected, with an arrangement being carried out in an immediate proximity with predetermined distance, lateral position and height with regard to a connectable machine (3) with control units (4), devices (4), drives (5) and drive consoles (5a), distribution blocks (6), valve units (7), control elements and the like being distributed over a horizontal, polygonal platform foundation surface (2) according to their functions with regard to the machine (3).

7 Claims, 2 Drawing Sheets

U.S. PATENT DOCUMENTS

Figure 1:
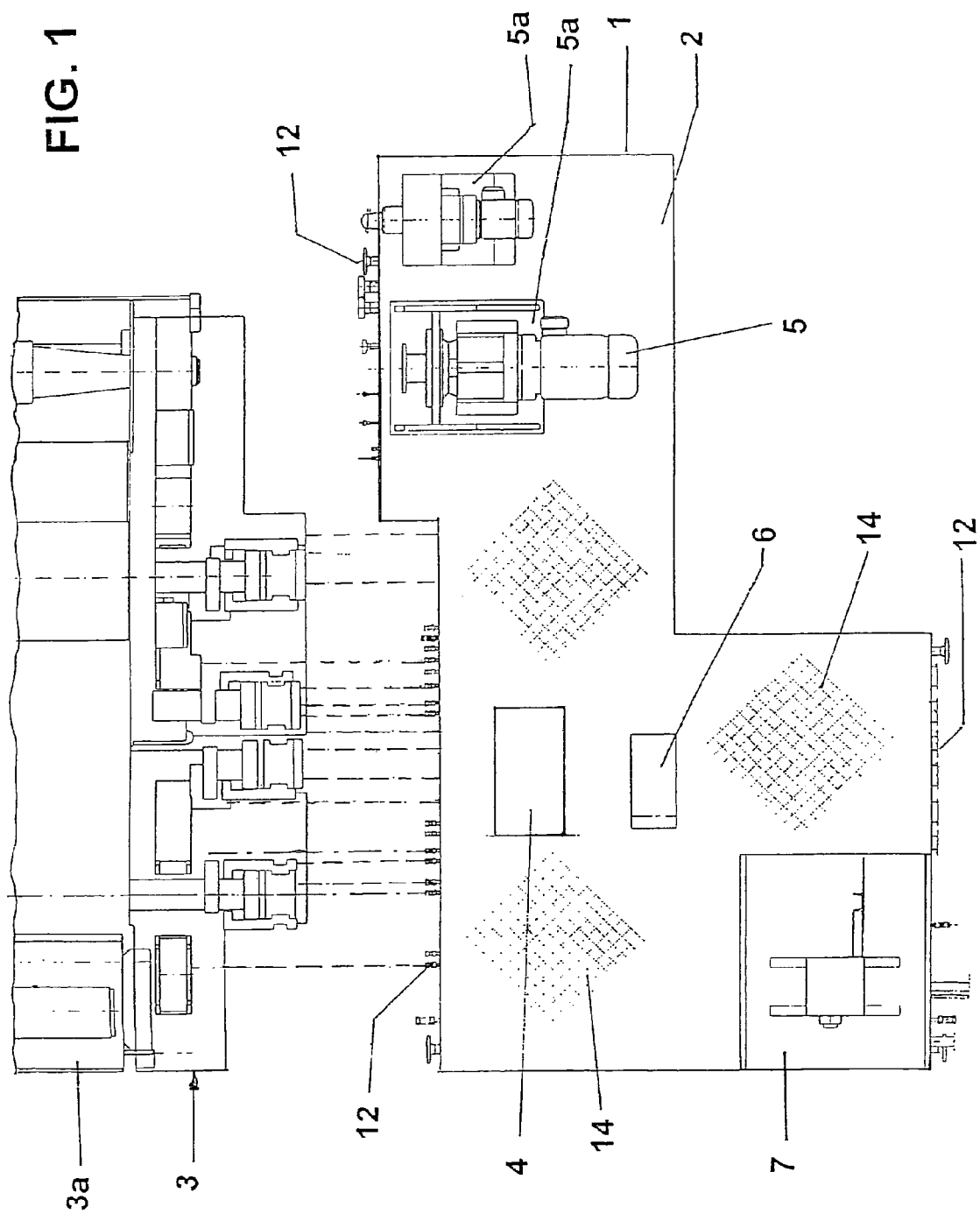

| | | | | |
|---|---|---|---|---|
| 5,979,206 A * | 11/1999 | Minnerop | | 72/239 |
| 6,119,323 A * | 9/2000 | Thone | | 29/81.08 |
| 6,161,413 A * | 12/2000 | Basso et al. | | 72/237 |
| 6,539,972 B1 | 4/2003 | Benner | | |
| 6,776,359 B2 * | 8/2004 | Cole et al. | | 239/536 |
| 7,028,523 B2 * | 4/2006 | Igelhorst et al. | | 72/236 |
| 7,784,316 B2 * | 8/2010 | Witschas | | 72/7.1 |
| 2003/0154758 A1 | 8/2003 | Svejkovsky | | |

FOREIGN PATENT DOCUMENTS

| | | |
|---|---|---|
| DE | 100 28 305 A1 | 12/2001 |

OTHER PUBLICATIONS

Search Report.

Hapeed Vorgerust & Staucher Bj. 1999 Veroeffentlichung Millenium Steel 2001.

Hapeed Vorgerust & Staucher Bj. 1999 Veroeffentlichung im Vatech VAI Rolling Technologie Dec. 1999.

F. Bayer, J. Strassere, J. Trenkleo The New Integrated Flat Steel Production Facility of HAPEED 3rd Annual Middle East Steel Congress, May 2000.

* cited by examiner

PLATFORM FOR INDUSTRIAL INSTALLATIONS, PARTICULARY FOR HIGH-PRESSURE DESCALERS, EMERGENCY SHEARS AND PENDULUM SHEARS IN ROLLING MILL TRAINS OR THE LIKE

The present invention relates to a platform for industrial installations, in particular for high-pressure descalers, emergency shears, and pendulum shears in rolling mill trains or the like with optionally bundled supply, discharge, and/or distribution conduits which in operational position, are connectable with fixed conduits of a respective machines.

Supply of the machine with hydraulic fluid, lubricating and cooling media, electrical energy, and control signals is effected through tubes and conduits over the foundation or in foundation trenches. In addition, e.g., ventilation units are arranged in a decentralized manner on the foundation, on separate consoles or on the floor. This arrangement leads to a large number of tubular conduits extending to a machine for which a large number of interfaces foundation/machine is necessary. Moreover, these interfaces are individually secured, arranged and, as a rule, are not transferable from installation to installation. Upon changes in the region of the machine, an installation-specific arrangement of lines for separate operational sites is required. Somewhat free-lying tubular conduits make access to the operational sites difficult. In addition, the free-lying tubular conduits are laid out randomly and also make access to different areas of a site between the conduits more difficult. The consoles of motors for driving rolls or the like, distribution blocks for high-pressure descaling are separately arranged on the foundation and anchored thereto. The tubing should inevitably be led around such consoles.

The media conduits are arranged in individual cases in so-called foundation channels. Waste water can penetrate in the foundation channels and cause accumulation of dirt and mud which with time can form a thick solid layer.

A drawback consists also in that installation features to be installed on the site such as, e.g., stands for measurement equipment, other supports and the like can be secured between the tubes only with large expenses or, because of lack of space, should be installed at a large distance.

European patent EP 1 100 634 B1 discloses an arrangement of supply, discharge and distribution conduits of a distribution network for fluid operational media such as, e.g., lubricating and cooling media, and for fluid hydraulic pressure media for servo mechanisms or drives of rolling mill stands provided with a column. At that, modules mountable on a stand are used, and tubular conduits are combined in groups. This arrangement is advantageous for a rolling mill stand, however, the principle cannot be used without further modification in other machines.

The object of the invention is to provide on a respective site a central installation for connecting media and power lines which can be monitored and easily controlled.

The set object is achieved according to the invention in that an arrangement of the platform in an immediate proximity with predetermined distance, lateral position and height with regard to a connectable, machine is carried out, and in that control units, devices, drives and drive consoles, distribution blocks, valve units, control elements and the like are distributed over a horizontal, polygonal platform foundation surface according to their functions with regard to the machine. The advantage of this arrangement consists in that: The expenses of equipping a site with tubings is reduced. The access to tube junctions, servo mechanisms and drives is improved. As a result of arrangement of control elements at a central location, the service works and control possibilities are favorably influenced. The hydraulic tubing in the foundation is noticeably reduced. The platform provides a large surface for a central arrangement of auxiliary components. In addition, definite and standardized interfaces are provided.

Tube connections have a better arrangement and are unambiguously associated with consumers.

According to an advantageous embodiment, there is provided a frame construction with adjusting feet and foundation fastening elements and in which media conduits are set in.

Other features consist in that tubular conduits for media, such as, e.g., hydraulic fluid, water, high-pressure water, air, lubricant and electrical conductors are provided ends of which project past the platform foundation surface by a connection section. The connections are located somewhat outside and are easily accessible.

The construction of the platform can be improved by providing supports for consoles, the distribution block, valve units, and the like.

Respective connection sections are formed as flange, welding or coupling connections.

It is further proposed to arrange, within the platform foundation surface, grids for discharge of liquids or cover sheets for accessibility. If necessary, it can thereby be prevented that spray water could flow through the platform.

A further advantage for the assembly of the platform consists in that it can be transported in an assembled condition as a unit.

The drawings show embodiments of the invention which will be described in detail below.

Figure 2:
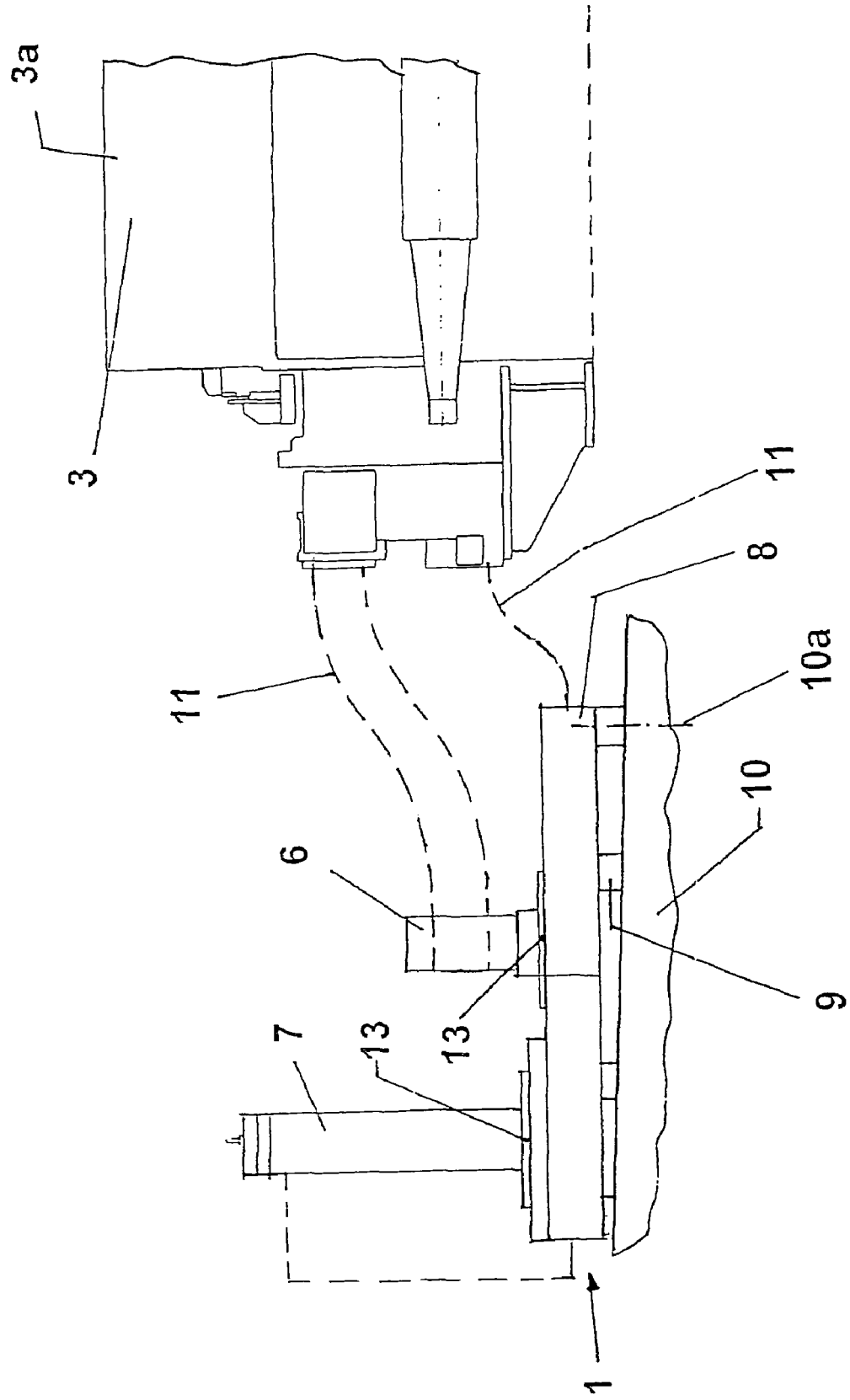

The drawings show:

FIG. 1 a plan view of the platform in combination with a high-pressure descaler, and FIG. 2 a side view to FIG. 1.

The platform 1 for industrial installations such as, e.g., high-pressure descaler 3a or universal machines 3 such as, e.g., emergency shears or pendulum shears in rolling mill trains, which is shown in FIG. 1, is equipped, optionally with bundled supply conduits, discharge conduits, and/or distribution conduits 11 which can be connected during operation, with fixed conduits of a respective machine 3. The platform 1 is placed in an immediate proximity of the machined at a distance predetermined for the individual machine at corresponding lateral position and a suitable height adapted to the connected machine 3. Associated control units or devices 4, drives 5 with drive console 5a, distributing blocks 6, valve units 7, control elements and the like are distributed over a horizontal, polygonal platform foundation surface 2 according to the function with regard to the machine 3.

FIG. 2 shows a frame construction 8 with adjustable feet 9 and foundation fastening elements 10a in the foundation 10 and which carries media conduits 11. Tubular conduits 11 are provided for media such as, e.g., hydraulic fluid, water, high-pressure water, air, compressed air, lubricant, and there are also provided electrical conductors the ends of which project past the platform foundation surface 2 by connection sections 12.

For supporting the consoles 5a, the distribution block 6 and the valve unit 7, there are provided respective supports 13.

The ends, which are provided with connection sections 12, are formed as flange, welding, or coupling connections (FIG. 1).

Within the platform foundation surface 2, there are provided a plurality of grids 14 for discharging of fluids, which may also be covered with cover sheets to provide for reliable accessibility.

The platform 1, which is shown in FIGS. 1-2, can be transported with all components in an assembled condition as a unit (by a crane or flat-bed trucks) to an operational site.

LIST OF REFERENCE NUMERALS

| | |
|---|---|
| 1. | Platform |
| 2. | Platform foundation surface |
| 3. | Machine |
| 3a. | High-pressure descaler |
| 4. | Control unit, device |
| 5. | Drive |
| 5a. | Drive console |
| 6. | Distribution block |
| 7. | Valve unit |
| 8. | Frame construction |
| 9. | Adjusting foot |
| 10. | Foundation |
| 10a. | Foundation fastening element |
| 11. | Supply, discharge, and/or distribution conduits |
| 12. | Connection section |
| 13. | Support |
| 14. | Grid |

The invention claimed is:

1. A mobile platform module used with different machines in a rolling mill train, the platform module comprising a horizontal polygonal platform foundation surface (2); at least some of control units (4), drives (5), drive consoles (5*a*), distribution blocks (6), valve units (7) mounted on the platform surface; and a plurality of supply, discharge, distribution conduits for connecting at least some of control units (4), drives (5), drive consoles (5*a*), distribution blocks (6), valve units (7), with respective fixed conduits of the machine (3) associated with respective functional components of the machine, wherein the platform is arrangeable in proximity of the machine and is adjustable at a predetermined distance therefrom and at adjustable predetermined lateral position and height relative to the machine dependent on dimensions of the machine, and wherein the at least some of the control units (4), drives (5), drive consoles (5*a*), distribution blocks (6), valve units (7) are distributed over the platform foundation surface (2) in accordance with functions thereof with regard to the machine.

2. A platform module according to claim 1, wherein the platform comprises a frame construction (8) defining the horizontal foundation surface (2) and having adjusting feet (9) for varying a frame construction height relative to a foundation, dependent on height of the machine and fastening elements (10*a*) for mounting the frame construction (8).

3. A platform module according to claim 1, wherein the conduits (11) are formed as tubular conduits and have respective connection ends (12) thereof projecting beyond the foundation surface (2).

4. A platform module according to claim 1, further comprising supports (13) extending substantially parallel to the horizontal foundation surface for supporting the drive consoles (5*a*), the distribution blocks (6), valve units (7).

5. A platform according to claim 3, wherein the connection ends (12) are formed as at least one of flanges, welding connection elements, and coupling elements.

6. A platform according to claim 1, wherein the horizontal platform foundation surface (2) includes liquid discharge grids (14) and walking-enabling cover sheets.

7. A platform according to claim 1, wherein the horizontal platform foundation surface is a large flat surface for enabling serving and monitoring functions of different components mounted on the platform.

* * * * *